(12) United States Patent
Asakaze (10) Patent No.: US 7,238,070 B2
(45) Date of Patent: Jul. 3, 2007

(54) OUTBOARD MOTOR

(75) Inventor: Ken Asakaze, Shizuoka-ken (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 56 days.

(21) Appl. No.: 11/172,178

(22) Filed: Jun. 30, 2005

(65) Prior Publication Data

US 2006/0019557 A1    Jan. 26, 2006

(30) Foreign Application Priority Data

Jun. 30, 2004    (JP) .............................. 2004-193498

(51) Int. Cl.
*B63H 23/34*    (2006.01)
(52) U.S. Cl. ...................................... 440/83
(58) Field of Classification Search .................. 440/83
See application file for complete search history.

(56) References Cited

U.S. PATENT DOCUMENTS 2,616,274 A * 11/1952 Porter ........................ 464/57
2,691,283 A * 10/1954 Stover ........................ 464/90
4,747,796 A    5/1988 Iwai et al.
4,925,409 A * 5/1990 Johnson ....................... 440/52
6,547,613 B1   4/2003 Onoue et al.

FOREIGN PATENT DOCUMENTS

JP    60-215495    10/1985
JP    2000-280983  10/2000

* cited by examiner

*Primary Examiner*—Stephen Avila
(74) *Attorney, Agent, or Firm*—Knobbe, Martens, Olson & Bear LLP (57) ABSTRACT

An outboard motor cam have a power transmission mechanism for transmitting rotational power of a crankshaft of an engine to a propeller through a drive shaft, an advancing/reversing-switching mechanism and a propeller shaft, and adapted to be propelled by the propeller being driven for rotation. A torque variation-absorbing device can be disposed in a coupling section between the crankshaft and the drive shaft, and supported through bearings.

9 Claims, 9 Drawing Sheets

OUTBOARD MOTOR

PRIORITY INFORMATION

The present application is based on and claims priority under 35 U.S.C. § 119 to Japanese Patent Application Ser. No. 2004-193498, filed Jun. 30, 2004, the entire contents of which is hereby expressly incorporated by reference.

BACKGROUND OF THE INVENTIONS

1. Field of the Inventions

The present inventions relate to an outboard motor mounted, for example, on a small watercraft or the like.

2. Description of the Related Art

Typically, outboard motors include a power transmission mechanism for transmitting rotational power of the crankshaft of an engine to a propeller through a drive shaft. An advancing/reversing-switching mechanism (also known as a forward-reverse-neutral transmission) connects the drive shaft with a propeller shaft and allows the propeller shaft to be shifted between neutral, forward, and reverse thrust modes.

The connections between various components of the drive trains typically used in outboard motors are provided with small clearances, often referred to as mechanical "play" to reduce friction at these connections and for other reasons. As such, the components forming the connections collide with each other at various times. For example, when the transmission is shifted, and when there are variations in the torque output from the engine, these components strike each other.

The collisions between these parts generate noises. These noises are particularly noticeable in large outboard motors such as those including high horse power four-stroke engines. Further, in outboard motors with high horsepower, the passengers of the associated boat can experience unpleasant shocks due to abrupt change in propulsion force produced, for example, at the time of shifting.

Thus, several different designs have been proposed for absorbing shocks, such as those designs in Japanese Patent Nos. JP-A-Sho 60-215495 (P1–P7, FIG. 1–FIG. 13) and JP-A-2000-280983 (P1–P10, FIG. 1–FIG. 13).

Japanese Patent No. JP-A-Sho 60-215495 discloses an arrangement in which a drive shaft is divided into a driving section and a driven section, and a shock absorbing device is disposed between the two sections. Japanese Patent No. JP-A-2000-280983 discloses an arrangement in which either a drive shaft or a propeller shaft is divided into a driving section and a driven section, and a shock absorbing device is disposed between two sections.

SUMMARY OF THE INVENTIONS

An aspect of at least one of the embodiments disclosed herein includes the realization that by supporting a portion of the drivetrain of an outboard motor with a bearing in the vicinity of a torque-variation absorbing device, a more effective torque variation absorbing device can be used. For example, a bearing can provide support to a drive train such that a softer, more compliant absorbing device, such as an absorbing device partially made with rubber or rubber-like materials, can be used in the vicinity of the bearing without sacrificing the integrity of the drivetrain.

Thus, in accordance with an embodiment, an outboard motor comprises an engine having a crankshaft, a drive shaft, an advancing/reversing-switching mechanism, a propeller shaft, a propeller, and a torque variation-absorbing device disposed in a coupling section between the crankshaft and the drive shaft. The torque variation-absorbing device can be supported through a bearing.

DETAILED DESCRIPTION OF THE PREFERRED EMBODIMENT

Non-limiting embodiments of an outboard motor are described below. These preferred embodiments are not intended to limit the scope of the inventions disclosed herein.

The embodiments disclosed herein are described in the context of a marine propulsion system of a small boat because these embodiments have particular utility in this context. However, the embodiments and inventions herein can also be applied to other marine vessels, such as personal watercraft and small jet boats, as well as other vehicles.

Figure 1:
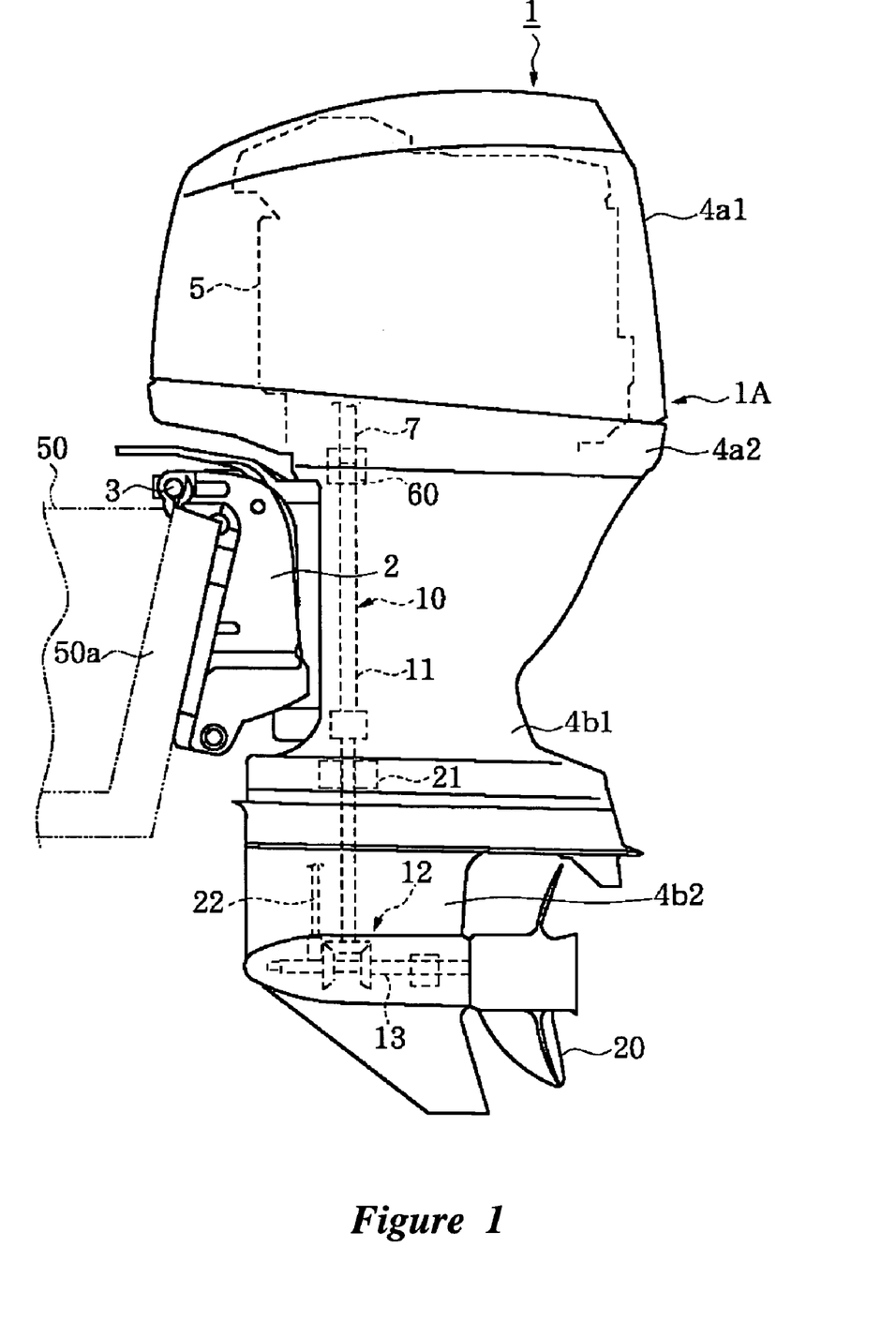
FIG. 1 is a side view of an outboard motor mounted on a small watercraft.

The outboard motor 1 of the illustrated embodiment is attached, through a clamping bracket 2, to a transom plate 50a provided on a hull 50 of a small watercraft (partially shown). An outboard motor body 1A of the outboard motor 1 is supported on the clamping bracket 2 for up and down pivotal movement about a tilting shaft 3 provided on the clamping bracket 2.

The outboard motor body 1A can have a cowling comprising a top cowling 4a1 and a lower cowling 4a2. The top cowling 4a1 is configured to removable from the lower cowling 4a2. Additionally, the outboard motor body 1A can include a casing made up of an upper casing 4b1 and a lower casing 4b2.

In the upper part of the outboard motor body 1A, an engine 5 can be housed in the top cowling 4a1 and the lower cowling 4a2. The engine 5 can be a four-stroke engine. However, this is merely one type of engine that can be used with the inventions disclosed herein. Engines having any number of cylinders, any cylinder arrangement, any cylinder orientation (e.g., upright cylinder banks, V-type, and W-type), and operating on any combustion principle (e.g., two stroke, diesel, and rotary) are all practicable for use with the inventions disclosed herein.

Below the outboard motor body 1A, a propeller 20 is supported on the lower casing 4b2. Rotational forces from the engine 5 are transmitted to the propeller 20 through a power transmission mechanism 10 housed in the upper casing 4b1 and lower casing 4b2.

The engine 5 can have a plurality of cylinders arranged vertically and a crankshaft disposed in the vertical direction, extending downwardly from the engine 5. The power transmission mechanism 10 can comprises a drive shaft 11, an advancing/reversing-switching mechanism 12 (a.k.a. forward/neutral/reverse transmission), a propeller shaft 13 and the like.

The drive shaft 11 is coupled to the crankshaft 7 with a torque variation-absorbing device 60. The drive shaft 11 extends downwardly from the engine 5. The advancing/reversing-switching mechanism 12 is configured to shift the rotational direction of the drive shaft 11 between forward and reverse. The propeller 20 can be attached to the rear end of the propeller shaft 13 an can be coupled to the advancing/reversing-switching mechanism 12 at the output side.

In the middle of the drive shaft 11 can be provided a water pump 21 driven by the drive shaft 11. Switching between advancing and reversing in the advancing/reversing-switching mechanism 12 can be accomplished with a shift rod 22.

With reference to FIG. 2 to FIG. 7, the torque variation-absorbing device 60 can have a crankshaft-side coupling body 61 spline-fitted in the crankshaft 7, a drive shaft-side coupling body 62 spline-fitted on the drive shaft 11, and a torque variation-absorbing body 63 that is disposed between the crankshaft-side coupling body 61 and the drive shaft-side coupling body 62. However, other arrangements can also be used.

Figure 2:
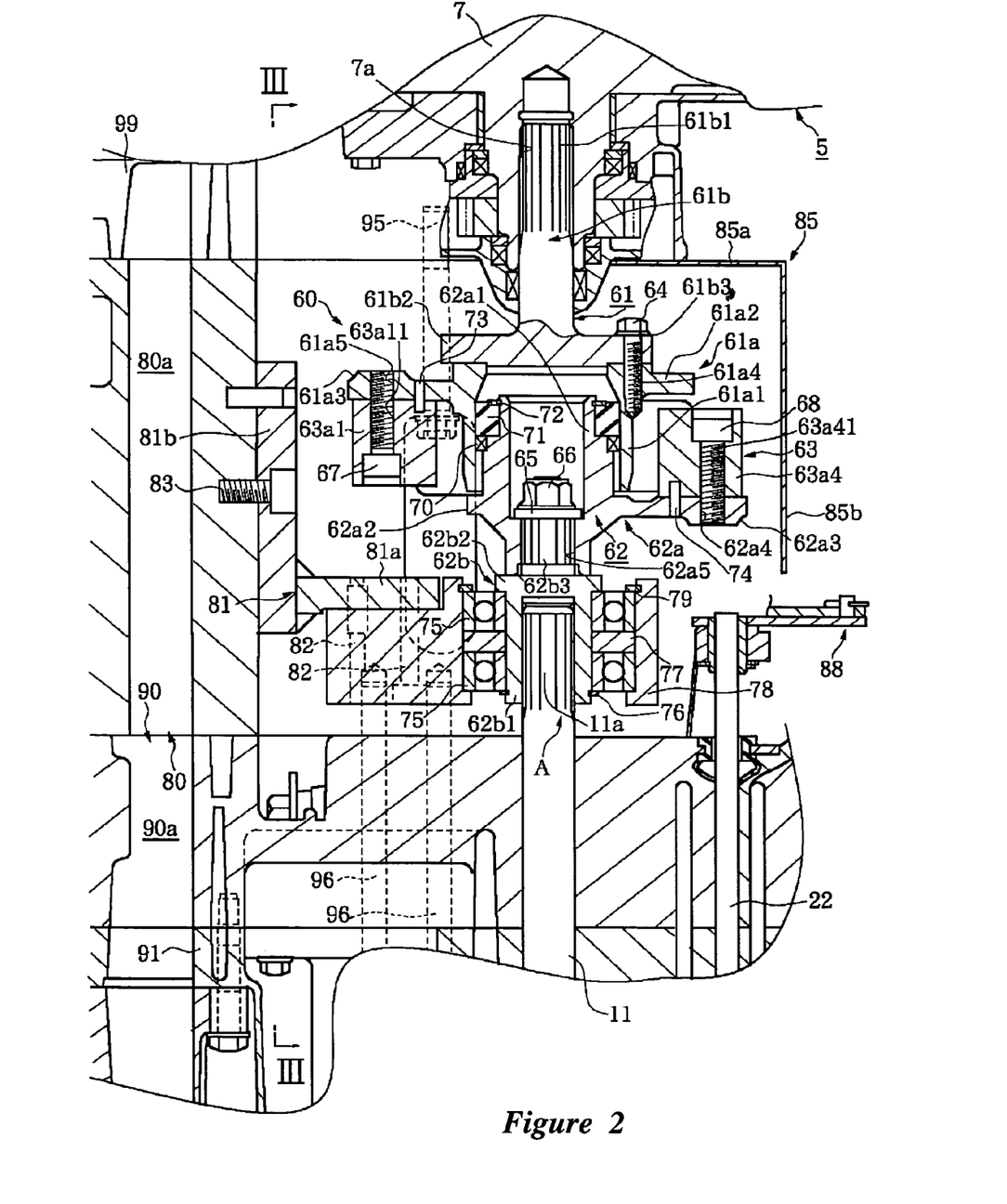
FIG. 2 is a sectional view of a torque variation-absorbing device in accordance with an embodiment.
Figure 5:
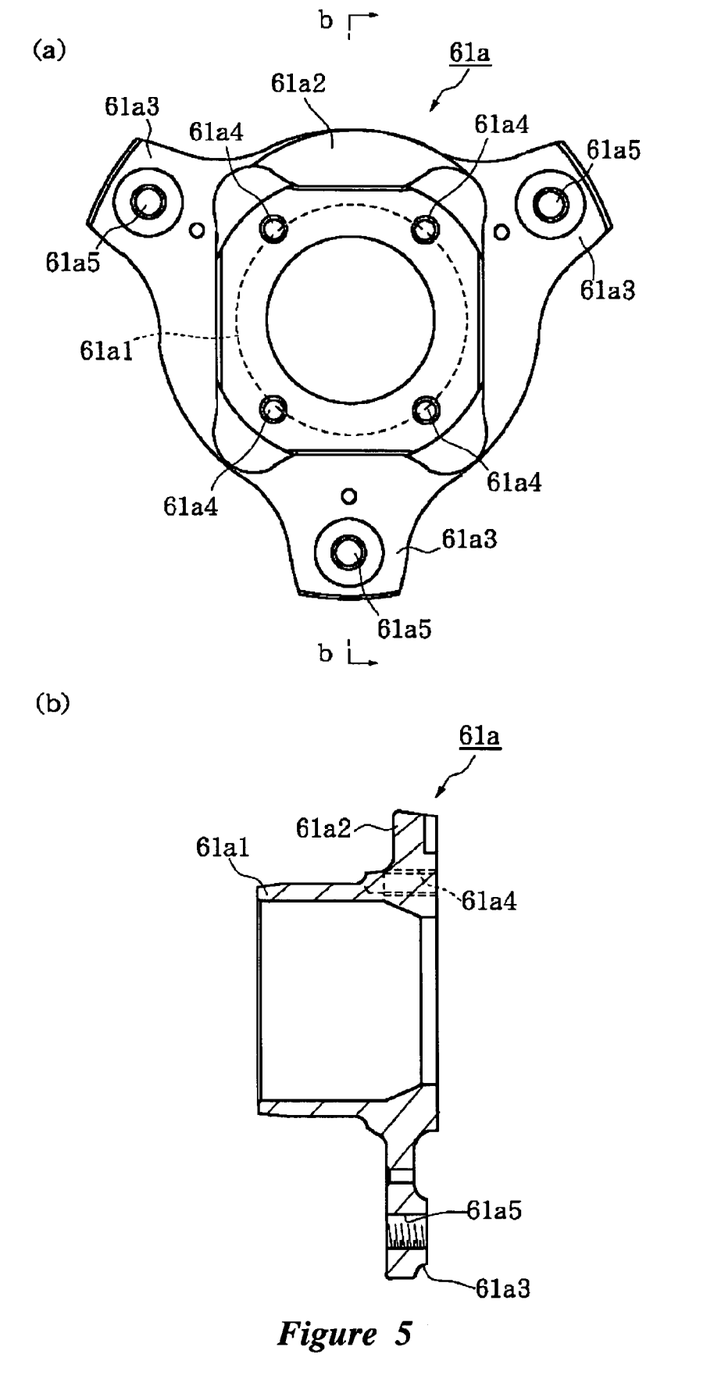
FIG. 5(a) is a plan view of a flange coupling of a crankshaft-side coupling body.
FIG. 5(b) is a sectional view of the flange coupling of FIG. 5(a) taken along line b—b.

With reference to FIGS. 5(a) and 5(b), the crankshaft-side coupling body 61 can be formed from a metallic material, through a process, such as, but without limitation, forging. The body 61 can have a flange coupling 61a and a spline coupling-shaft section 61b, as shown in FIG. 2 and FIG. 5.

The flange coupling 61a can have a cylinder portion 61a1, a flange portion 61a2 formed at one end of the cylinder portion 61a1, and three flange portions 61a3 extending outwardly from the flange portion 61a2 at positions angularly spaced by approximately 120°, however, other arrangements and other numbers of flanges can also be used.

The flange portion 61a2 can be formed with mounting female screw holes 61a4 for the coupling to the spline coupling-shaft section 61b, at four locations angularly spaced by approximately 90°, however, other arrangements can also be used. Also, each of the three mounting portions 61a3 can be formed with a mounting female screw hole 61a5 for the coupling to the torque variation-absorbing body 63.

The spline coupling-shaft section 61b can have a spline shaft portion 61b1, and a flange portion 61b2 formed at the end of the spline shaft portion 61b1. The flange portion 61b2 can be formed with mounting through-holes 61b3 for the coupling to the flange coupling 61a, at four locations.

The flange coupling 61a and the spline coupling-shaft section 61b can be coupled together with four fastening members or bolts 64 each inserted into the mounting through-hole 61b3 of the spline coupling-shaft section 61b and fitted in the mounting female screw hole 61a4 of the flange coupling 61a for fixing, although other arrangements and connections can also be used.

Figure 6:
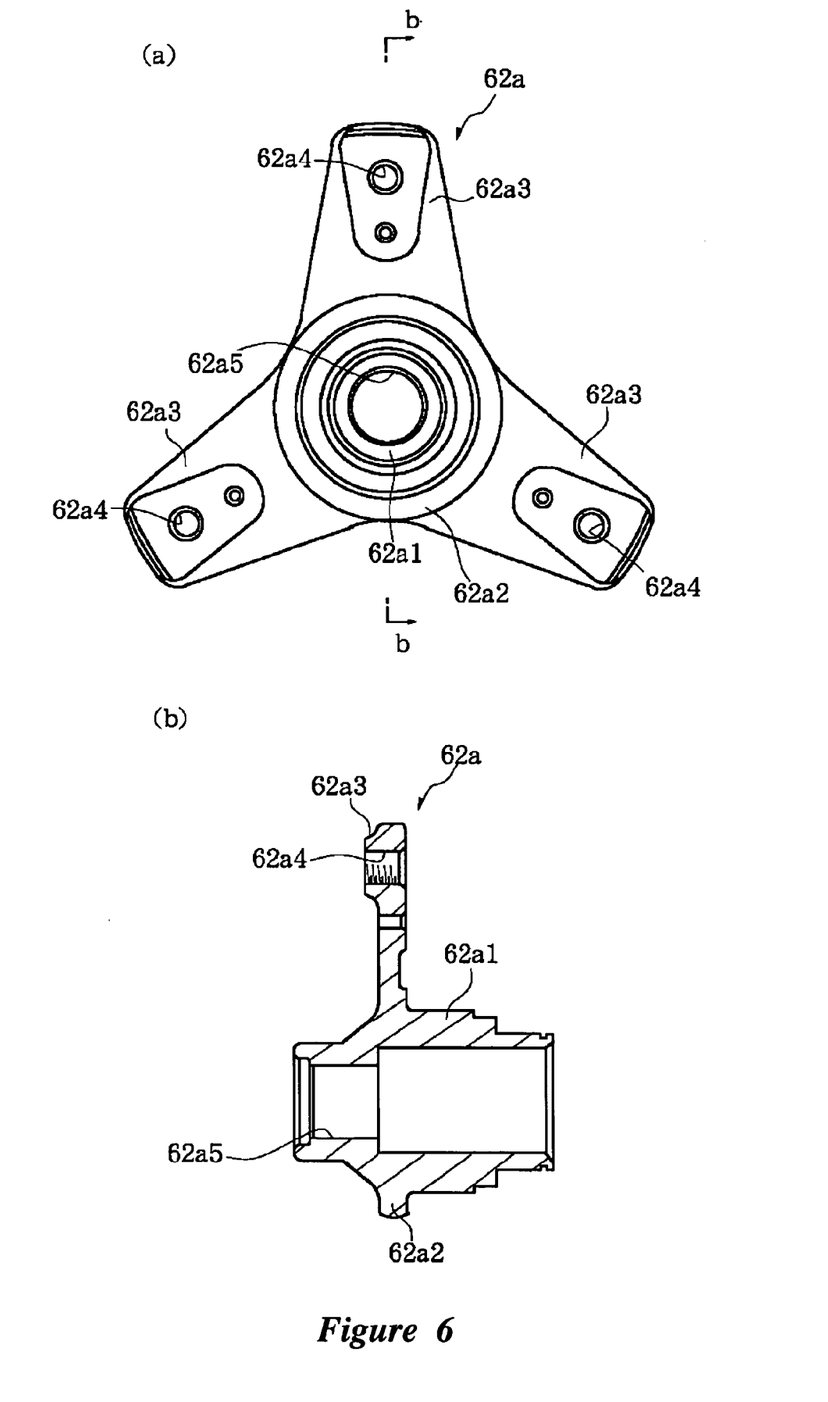
FIG. 6(a) is a plan view of a flange coupling of a drive shaft-side coupling body.
FIG. 6(b) is a sectional view of the a flange coupling of FIG. 6(a) taken along line b—b.

With reference to FIGS. 6(a) and 6(b), the drive shaft-side coupling body 62 can be formed from a metallic material by a process such as, for example, but without limitation, forging. The body 62 can have a flange coupling 62a and a spline coupling-shaft section 62b, as shown in FIG. 2 and FIG. 6. The flange coupling 62a can have a cylinder portion 62a1, a flange portion 62a2 formed at the end of the cylinder portion 62a1, and three flange portions 62a3 extending outwardly from the flange portion 62a2 at positions angularly spaced by approximately 120°, although other arrangements and numbers of flanges can also be used.

Each of the three mounting portions 62a3 can be formed with a mounting female screw hole 62a4 for the coupling to the torque variation-absorbing body 63. Also, the cylinder portion 62a1 can be formed with a mounting spline hole 62a5 for the coupling to the spline coupling-shaft section 62b, at its axial center.

The spline coupling-shaft section 62b can have a spline bottomed cylinder portion 62b1, a flange portion 62b2 formed at the bottom of the spline bottomed cylinder portion 62b1, and a mounting spline shaft portion 62b3 formed at the bottom of the spline bottomed cylinder portion 62b1 and extending in the axial direction, as shown in FIG. 2.

The flange coupling 62a and the spline coupling-shaft section 62b can be coupled together, with the mounting spline shaft portion 62b3 of the spline coupling-shaft section 62b spline-fitted in a mounting spline hole 62a5 of the flange coupling 62a and with a nut 66 fastened through a washer 65 to the mounting spline shaft portion 62b3 for fixing. However, other arrangements and connections can also be used.

Figure 7:
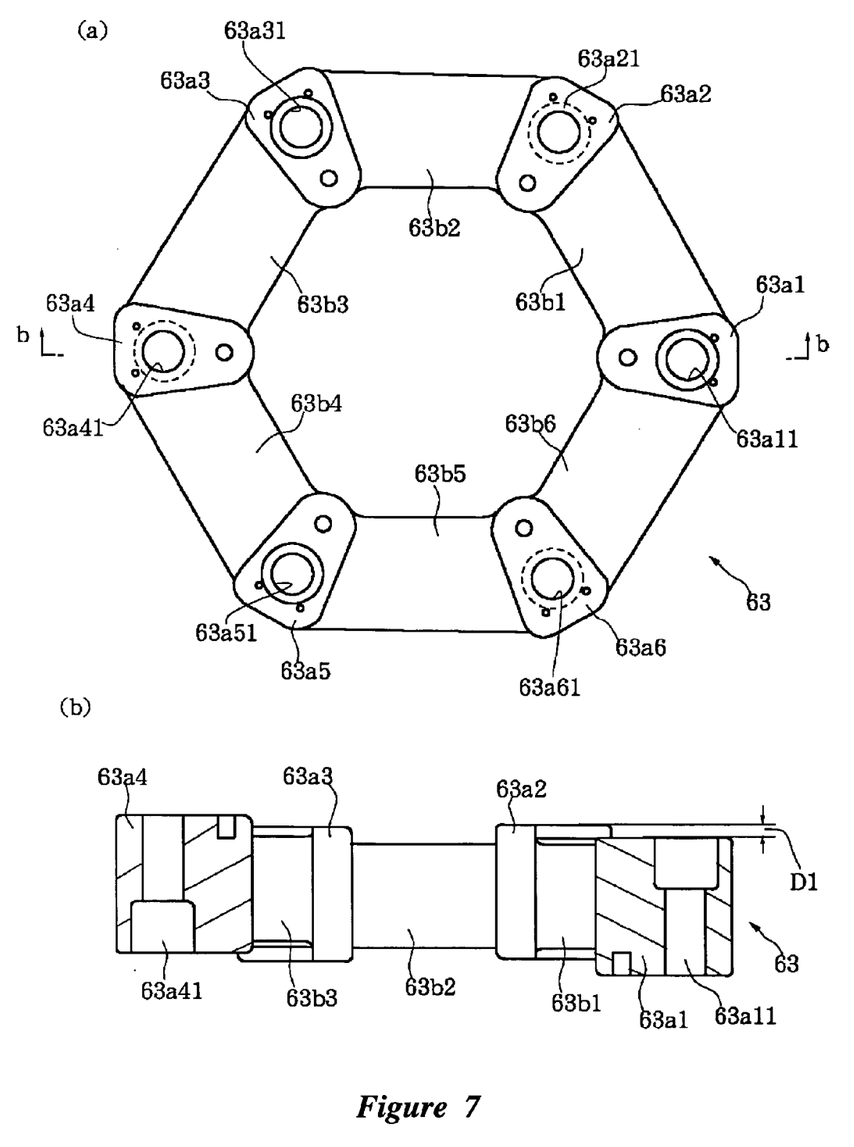
FIG. 7(a) is a plan view of a torque variation-absorbing body.
FIG. 7(b) is a sectional view of the torque variation-absorbing body of FIG. 7(a) taken along line b—b.
Figure 8:
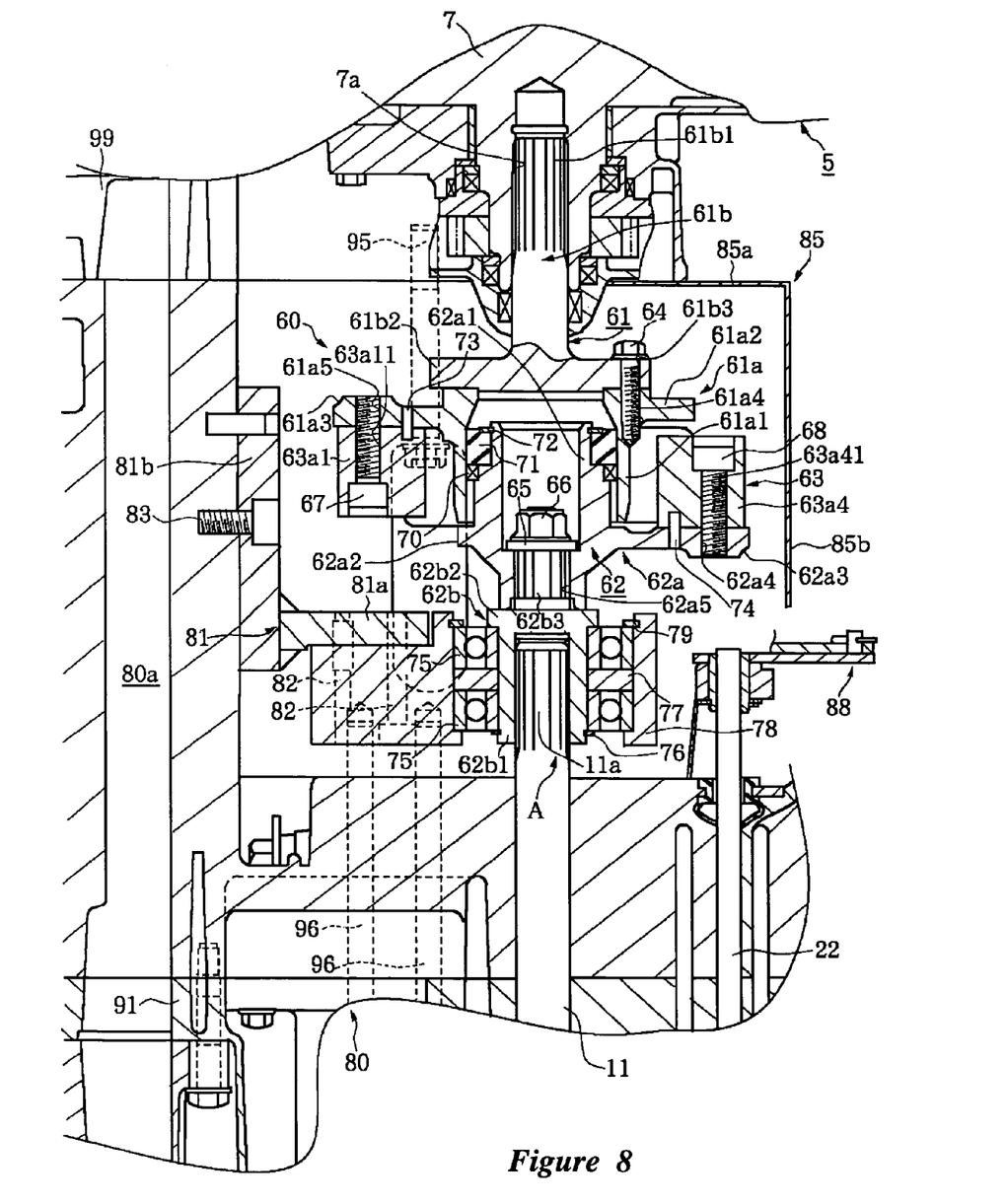
FIG. 8 is a sectional view showing the torque variation-absorbing device mounted within the outboard motor.

With reference to FIGS. 7(A) and 7(b), the torque variation-absorbing body 63 can be made up of insert metals and rubber members, having six insert metals 63a1–63a6 and six rubber members 63b1–63b6, as shown in FIG. 2 and FIG. 7. However, other arrangements and numbers of insert metals and rubber members can also be used.

The six insert members 63a1–63a6 can be located at the corners of an equilateral hexagon, respectively, as shown in FIG. 7, although other arrangements can also be used. The six rubber members 63b1–63b6 can each be coupled to their respective insert metals 63a1–63a6, so that the torque variation-absorbing body 63 can be formed in the annular shape of an equilateral hexagon.

Of the insert metals 63a1–63a6, the insert metals 63a2, 63a4, 63a6 can each be disposed so as to be offset by a distance D1. The non-offset insert metals 63a1, 63a3, 63a5 can be formed with mounting through-holes 63a11, 63a31, 63a51 for the mounting to the flange coupling 61a.

The offset insert metals 63a2, 63a4, 63a6 can be formed with mounting through-holes 63a21, 63a41, 63a61 for the mounting to the flange coupling 62a, respectively. The torque variation-absorbing body 63 can be disposed between the crankshaft-side coupling body 61 and the drive shaft-side coupling body 62. Regarding the drive shaft-side coupling body 62, an oil seal 70 and a bushing 71 can be supported on the cylinder portion 62a1 of the flange coupling 62a by a circlip 72, and the cylinder portion 62a1 can be fitted in the cylinder portion 61a1 of the flange coupling 61a to assemble the crankshaft-side coupling body 61 and the drive shaft-side coupling body 62.

Regarding the torque variation-absorbing body 63 and the crankshaft-side coupling body 61, the insert metals 63a1, 63a3, 63a5 can be assembled to the three mounting portions 61a3 of the flange coupling 61a through spring pins 73. Crankshaft-side fastening members 67 can be inserted in the mounting through-holes 63a11, 63a31, 63a51 to be screwed in the female screw holes 61a5 for fixing.

Regarding the torque variation-absorbing body 63 and the drive shaft-side coupling body 62, the insert metals 63a2, 63*a*4, 63*a*6 of the torque variation absorbing body 63 can be assembled to the three mounting portions 62*a*3 of the flange coupling 62*a* through spring pins 74. Crankshaft-side fastening members 68 can be inserted in the mounting through-holes 63*a*21, 63*a*41, 63*a*61 to be screwed in the female screw holes 62*a*4 for fixing.

As described above, since the torque variation-absorbing body 63 can be fastened fixedly to the crankshaft-side coupling body 61 and the drive shaft-side coupling body 62, easy and firm integration can be effected without using a special fixing structure.

In the drive shaft-side coupling body 62, two bearings 75 can be supported on the spline bottomed cylinder portion 62*b*1 of the spline coupling-shaft section 62*b* by a circlip 76. A collar 77 can be disposed between the two bearings 75.

On the two bearings 75, a bearing holder 78 can be held by a circlip 79. Thus, the torque variation-absorbing device 60 and the bearings 75 can be assembled in advance and arranged as a torque variation-absorbing unit A, thereby providing easy assembly between the engine 5 and the guide exhaust 90 or between the guide exhaust 90 and the upper casing 4*b*1.

In this torque variation-absorbing unit A, the spline shaft portion 61*b*1 of the spline coupling-shaft section 61*b* can be spline fitted into the spline hole section 7*a* of the crankshaft 7, the spline bottomed cylinder portion 62*b*1 of the spline coupling-shaft section 62*b* can be spline-fitted on the drive shaft 11 at the spline upper end 11*a* thereof, and the bearing holder 78 can be disposed so as to be attached to a bracket 81 of a block 80.

Figure 3:
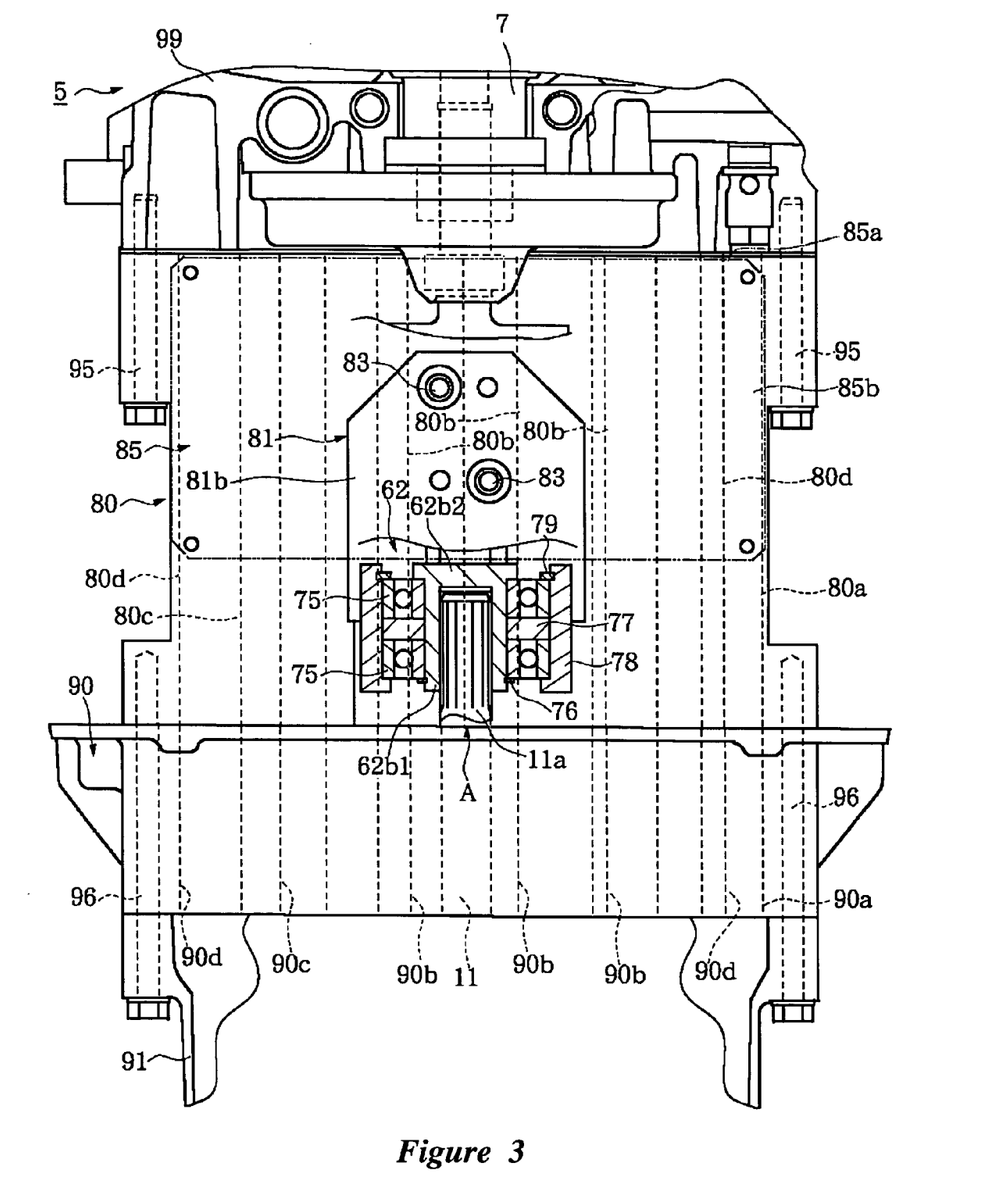
FIG. 3 is a sectional view taken along line III—III of FIG. 2.

The bracket 81 can have a bearing holder-mounting portion 81*a* and a block-mounting portion 81*b*, as shown in FIG. 2 and FIG. 3. The bearing holder-mounting portion 81*a* and the bearing holder 78 of the bracket 81 can be fastened fixedly with bolts 82. The block-mounting portion 81*b* and the block 80 can be fastened fixedly with bolts 83. As such, the bearings 75 can be fixed relative to the crankcase 99 while rotatably supporting the driveshaft 11.

The block 80 can be disposed between the engine 5 and the guide exhaust member 90, as shown in FIG. 2 and FIG. 3. Onto the top side of the block 80 can be fastened fixedly a crankcase 99 with bolts 95. Below the block 80, the guide exhaust 90 and an exhaust box 91 can be mounted with bolts 96.

Figure 4:
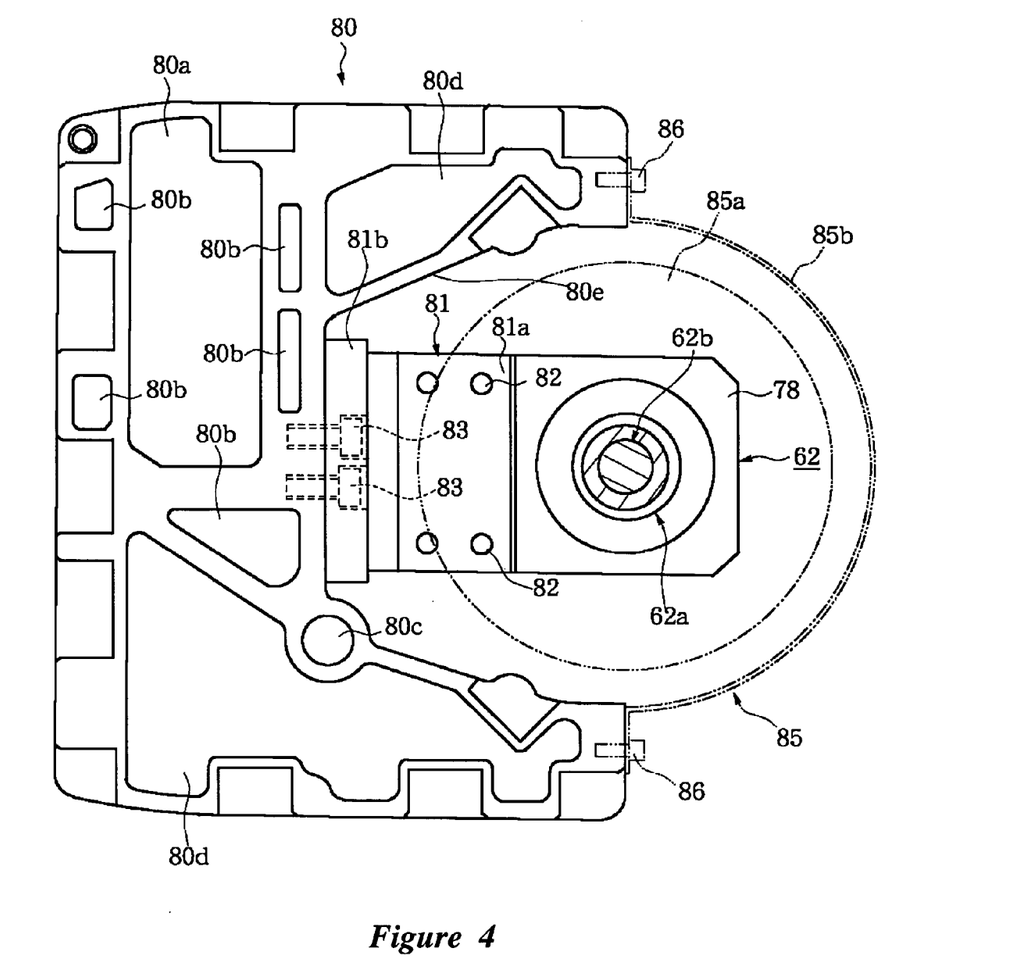
FIG. 4 is a plan view of a bearing block that can be used to support the torque variation-absorbing device.

The block 80 can be provided with an exhaust gas passage 80*a*, a cooling water passage 80*b*, a supply-lubricating oil passage 80*c* and a return-lubricating oil passage 80*d*, as shown in FIG. 3 and FIG. 4. The guide exhaust 90 can be provided with an exhaust gas passage 90*a*, a cooling water passage 90*b*, a supply-lubricating oil passage 90*c* and a return-lubricating oil passage 90*d*, as shown in FIG. 2 and FIG. 3.

The exhaust gas passage 80*a*, cooling water passage 80*b*, supply-lubricating oil passage 80*c* and return-lubricating oil passage 80*d* in the block 80 can be in communication with the exhaust gas passage 90*a*, cooling water passage 90*b*, supply-lubricating oil passage 90*c* and return-lubricating oil passage 90*d* of the guide exhaust 90, respectively. Thus, various kinds of passages can be formed in the block 80, thereby providing easy communication between these various kinds of passages.

In addition, a cover 85 for covering the torque variation-absorbing device 60 can be fastened fixed to the block 80 with bolts 86, as shown in FIG. 2 and FIG. 4. The cover 85 can have a portion 85*a* covering the upper side of the torque variation-absorbing device and a portion 85*b* covering half the side thereof, and opens downwardly.

A recessed portion 80*e* of the block 80 can cover approximately a half of the torque variation-absorbing device 60 in the lateral direction. The cover 85 can be configured to cover the torque variation-absorbing device 60 from the upper side and approximately half of the device 60 in the lateral direction, as viewed in FIG. 4. As such, the cover 85 can prevent electric wires or the like from contacting the torque variation-absorbing device 60.

The block 80 can be supported on the upper casing 4*b*1 and the bearings 75 can be mounted to the block 80 through the bearing holder 78 and bracket 81. As such, the block 80 allows easy formation of various kinds of passages and a simple mounting structure.

Further, the guide exhaust 90 can be arranged such that it can be formed like a block, with one portion extending upwardly. The bearings 75 can be mounted to the guide exhaust 90 in the same construction. The guide exhaust 90 can be supported on the upper casing 4*b*1. Utilizing the guide exhaust 90 allows simple and reliable mounting of the bearings 75.

Figure 9:
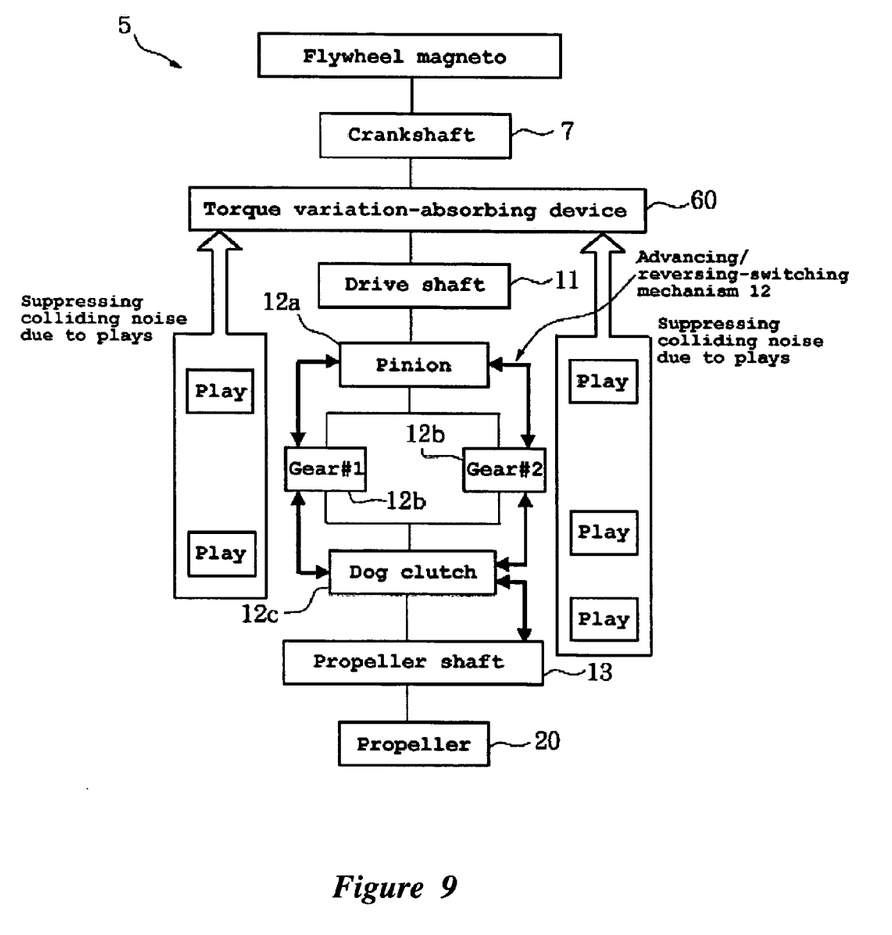
FIG. 9 is a schematic block diagram, showing a power transmission mechanism in accordance with an embodiment.

In this embodiment, as shown in FIG. 9, a flywheel magneto can be provided above the crankshaft 7 of the engine 5. During operation, rotational power of the crankshaft 7 can be transmitted to the propeller 20 through the torque variation-absorbing device 60, drive shaft 11, advancing/reversing-switching mechanism 12 and propeller shaft 13. The advancing/reversing-switching mechanism 12 can have a pinion 12*a*, gears 12*b* and a dog clutch 12*c*. Although mechanical play still exists between the various parts of the power transmission mechanism from the drive shaft 11 to the propeller shaft 13 and torque variations are produced during engine operation, the torque variations and vibrations from collisions can be absorbed by the torque variation-absorbing body 63 of the torque variation-absorbing device 60. As such, the noise of colliding parts can be reduced. Further, riders will experience less unpleasant shocks.

In this embodiment, as shown in FIG. 9, since the torque variation-absorbing device 60 can be disposed in a coupling section between the crankshaft 7 and drive shaft 11 and the coupling section of the power transmission mechanism can be utilized to dispose the torque variation-absorbing device 60, a simple structure can be obtained without need of dividing the drive shaft 11, for example. In addition, the section where torque variations can be absorbed can be supported reliably through bearings 75. As such, collision noises of the power transmission mechanism can be reduced and unpleasant shock feelings transmitted to riders can be reduced.

Further, as described above, the torque variation-absorbing device 60 can be disposed between the crankshaft 7 and the drive shaft II, so that the space under the engine can be utilized to dispose a shift operation member 88 or the like without interference. Furthermore, since the torque variation-absorbing device 60 can be located above the drive shaft 11, its assembly or maintenance can be performed easily from the engine side.

The torque variation-absorbing device 60 comprises a torque variation-absorbing body 63, a crankshaft-side coupling body 61 and a drive shaft-side coupling body 62, providing a simple structure in which the coupling section of the crankshaft 7 and the drive shaft 11 can be utilized to dispose the torque variation-absorbing device 60. Further, the drive shaft-side coupling body 62 located below the torque variation-absorbing device 60 can be supported reliably by the bearings 75.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the bearing is mounted to a block having an exhaust gas passage, a cooling water passage and a lubricating oil passage, and the block is disposed between the crankshaft and the drive shaft.

2. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft, a drive shaft-side coupling body that is spline-fitted to the drive shaft, and a torque variation-absorbing body that is disposed between the crankshaft-side coupling body and the drive shaft-side coupling body, wherein the bearing is mounted to a block having an exhaust gas passage, a cooling water passage and a lubricating oil passage, and the block is disposed between the crankshaft and the drive shaft.

3. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft a drive shaft-side coupling body that is spline-fitted to the drive shaft, and a torque variation-absorbing body that is disposed between the crankshaft-side coupling body and the drive shaft-side coupling body, wherein the torque variation-absorbing body is fastened fixedly to the crankshaft-side coupling body with crankshaft-side fastening members and to the drive shaft-side coupling body with drive shaft-side fastening members, wherein the bearing is mounted to a block having an exhaust gas passage, a cooling water passage and a lubricating oil passage, and the block is disposed between the crankshaft and the drive shaft.

4. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft, a drive shaft-side coupling body that is spline-fitted to the drive shaft, and a torque variation-absorbing body that is disposed between the crankshaft-side coupling body and the drive shaft-side coupling body, wherein the torque variation-absorbing body is fastened fixedly to the crankshaft-side coupling body with crankshaft-side fastening members and to the drive shaft-side coupling body with drive shaft-side fastening members, wherein the drive shaft-side coupling body is supported through a bearing, wherein the bearing is mounted to a block having an exhaust gas passage, a cooling water passage and a lubricating oil passage, and the block is disposed between the crankshaft and the drive shaft.

5. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the bearing is mounted to an exhaust guide having an exhaust gas passage, a cooling water passage and a lubricating oil passage.

6. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft, a drive shaft-side coupling body that is spline-fitted to the drive shaft, and a torque variation-absorbing body that is disposed between the crankshaft-side coupling body and the drive shaft-side coupling body, wherein the bearing is mounted to an exhaust guide having an exhaust gas passage, a cooling water passage and a lubricating oil passage.

7. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft, a drive shaft-side coupling body that is spline-fitted to the drive shaft, and a torque variation-absorbing body that is disposed between the crankshaft-side coupling body and the drive shaft-side coupling body, wherein the torque variation-absorbing body is fastened fixedly to the crankshaft-side coupling body with crankshaft-side fastening members and to the drive shaft-side coupling body with drive shaft-side fastening members, wherein the bearing is mounted to an exhaust guide having an exhaust gas passage, a cooling water passage and a lubricating oil passage.

8. An outboard motor comprising an engine having a crankshaft, a drive shaft, an advancing/reversing-switching mechanism, a propeller shaft, a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft, a drive shaft-side coupling body that is spline-fitted to the drive shaft, and a torque variation-absorbing body that is disposed between the crankshaft-side coupling body and the drive shaft-side coupling body, wherein the torque variation-absorbing body is fastened fixedly to the crankshaft-side coupling body with crankshaft-side fastening members and to the drive shaft-side coupling body with drive shaft-side fastening members, wherein the drive shaft-side coupling body is supported through a bearing, wherein the bearing is mounted to an exhaust guide having an exhaust gas passage, a cooling water passage and a lubricating oil passage.

9. An outboard motor comprising an engine having a crankshaft, a drive shaft, an advancing/reversing-switching mechanism, a propeller shaft a propeller, a torque variation-absorbing device disposed in a coupling section between the crankshaft and the drive shaft, wherein the torque variation-absorbing device is supported through a bearing, wherein the torque variation-absorbing device includes a crankshaft-side coupling body that is spline-fitted to the crankshaft, a drive shaft-side coupling body that is spline-fitted to the drive shaft, and a torque variation-absorbing body that is disposed between the crankshaft-side coupling body and the drive shaft-side coupling body, wherein the torque variation-absorbing body is fastened fixedly to the crankshaft-side coupling body with crankshaft-side fastening members and to the drive shaft-side coupling body with drive shaft-side fastening members, wherein the drive shaft-side coupling body is supported through a bearing, wherein the torque variation-absorbing device and the bearing are assembled as a torque variation-absorbing unit, wherein the bearing is mounted to an exhaust guide having an exhaust gas passage, a cooling water passage and a lubricating oil passage.

\* \* \* \* \*

UNITED STATES PATENT AND TRADEMARK OFFICE
CERTIFICATE OF CORRECTION

PATENT NO. : 7,238,070 B2
APPLICATION NO. : 11/172178
DATED : July 3, 2007
INVENTOR(S) : Ken Asakaze It is certified that error appears in the above-identified patent and that said Letters Patent is hereby corrected as shown below:

Title Page; item (57);
At page 1, column 2 (Abstract), line 1, please delete "cam" and insert -- can --, therefor.

At column 7, line 52, in Claim 3, please delete "crankshaft" and insert -- crankshaft, --, therefor.

At column 9, line 12, in Claim 9, please delete "shaft" and insert -- shaft, --, therefor.

Signed and Sealed this

Twenty-ninth Day of July, 2008

JON W. DUDAS
*Director of the United States Patent and Trademark Office*